United States Patent [19]

Binder et al.

[11] Patent Number: 5,071,456
[45] Date of Patent: Dec. 10, 1991

[54] AIR FILTER WITH RADIALLY SEALING FILTER INSERT

[75] Inventors: Walter Binder, Backnang-Steinbach; Hans Erdmannsdoerfer, Ludwigsburg; Gerhard Henning, Ingersheim; Bruno Sommer, Ludwigsburg, all of Fed. Rep. of Germany

[73] Assignee: Filterwerk Mann+Hummel GmbH, Ludwigsburg, Fed. Rep. of Germany

[21] Appl. No.: 595,867

[22] Filed: Oct. 10, 1990

[30] Foreign Application Priority Data

Oct. 14, 1989 [DE] Fed. Rep. of Germany ....... 3934433

[51] Int. Cl.$^5$ ............................................. B01D 46/10
[52] U.S. Cl. ........................................ 55/502; 55/509; 55/510; 55/521
[58] Field of Search ................. 55/497, 498, 502, 509, 55/510, 521

[56] References Cited

U.S. PATENT DOCUMENTS

| 3,385,034 | 5/1968 | Farr | 55/502 X |
|---|---|---|---|
| 4,227,898 | 10/1980 | Kamekawa et al. | 55/276 |
| 4,482,368 | 11/1984 | Roberts | 55/502 X |
| 4,559,066 | 12/1985 | Hunter et al. | 55/498 X |
| 4,632,682 | 12/1986 | Erdmannsdörfer | 55/498 |
| 4,720,292 | 1/1988 | Engel et al. | 55/498 X |
| 4,759,783 | 7/1988 | Machado | 55/498 |

FOREIGN PATENT DOCUMENTS

| 1934075 | 3/1966 | Fed. Rep. of Germany . |
|---|---|---|
| 1815065 | 8/1970 | Fed. Rep. of Germany . |
| 2711111 | 9/1977 | Fed. Rep. of Germany ........ 55/502 |

Primary Examiner—Charles Hart
Attorney, Agent, or Firm—Foley & Lardner

[57] ABSTRACT

An air filter for an internal combustion engine having a housing 10 with an air inlet 11 on the raw air side and an air outlet 12 on the clean air side. The air outlet has a tubular projection 27 extending into the housing 10 on which a filter insert 15 can be removably fastened. Air passes through the filter insert 15 radially from the outside in. To seal the filter insert 15 on the tubular projection 27, a radial gasket 23 is provided which has an attachment portion clamped by an inwardly extended flange on an end plate 19 of the filter insert, and which has a seal portion with a sealing area arranged adjacent the attachment portion.

6 Claims, 3 Drawing Sheets

AIR FILTER WITH RADIALLY SEALING FILTER INSERT

BACKGROUND OF THE INVENTION

This invention relates to an air filter for an internal combustion engine, especially for a motor vehicle, having a housing which has an air inlet at the raw air end and an air outlet at the clean air end, the air outlet being provided with a tubular nipple pointing into the interior of the housing and an annular filter insert being releasably fastened in the housing, wherein air flows radially through the filter insert from the outside in, and a radial gasket is provided on the end of the filter facing the tubular nipple, which engages the tubular nipple and seals the raw air chamber from the clean air chamber.

Published German Patent Application No. DE-OS 18 15 065 describes an air filter for an internal combustion engine, in which a filter insert is provided with a disk-shaped gasket which seals the raw air chamber from the clean air chamber. The gasket shown therein is fastened to the filter insert by providing a flange on one end disk of the filter insert, forming in combination with the end disk an annular groove into which the gasket is tightly fitted. When the filter insert is installed in the housing, this gasket slides along the inner wall of the housing until the filter insert has reached its installed position.

One disadvantage of this gasket is that, when the filter insert is installed, the gasket is severely deformed and bulges in the direction opposite the direction of installation. The result may be that, in the installed state, the reliable sealing of the clean air chamber will not be absolutely certain, and there is a danger that unfiltered air will enter the clean air chamber.

When an air filter is used in motor vehicles, vibrations of different frequencies must be expected. These vibrations can cause the air filter to enter into resonant vibration. In this case too the gasket must provide a reliable seal. In the known gasket, however, there is a danger that, due to the small effective sealing area and the gasket's low rigidity, seal problems may arise when subject to vibrations.

German Utility Model No. 19 34 075 furthermore discloses a combination of two cylindrical bodies provided with a gasket. The gasket there is provided with two sealing lips facing opposite sides. This gasket is intended to provide primarily for a reliable sealing of the two parts under varying pressure conditions.

A disadvantage of this known arrangement is that, particularly when the two parts to be sealed off from one another are assembled and disassembled, there is a danger that the gasket may roll up or be clamped between the parts and become damaged. Furthermore, the gasket is by its nature complicated to manufacture and therefore is not suitable for use in air filters.

SUMMARY OF THE INVENTION

The object of the invention is to provide an air filter for an internal combustion engine, in which the clean air chamber is reliably sealed off from the raw air chamber with a low-cost gasket.

These and other objects of the invention are achieved by providing an air filter for an internal combustion engine comprising a housing having an air inlet at a raw air side and an air outlet at a clean air side, the air outlet being provided with a tubular projection extending into the interior of the housing, and an annular filter insert releasably fastened in the housing such that air flows radially through the filter insert from the outside in, the filter insert having a radial gasket provided on one end of the annular filter insert facing the tubular projection, the gasket engaging the tubular projection and sealing a raw air chamber from a clean air chamber in the filter, the radial gasket (23) comprising an attachment portion provided with an annular bead (25) and having a height which is smaller than an intermediate space between the one end of the annular filter and the tubular projection, the radial gasket (23) further comprising a seal portion arranged axially adjacent the attachment portion, the seal portion producing a seal (24) between the tubular projection (27) and the one end of the filter insert (15), and wherein an attachment ring (19) is arranged on the filter insert (15), the attachment ring engaging the radial gasket (23) and extending around the annular bead (25) of the attachment portion to attach the gasket to the filter insert.

An important advantage of the invention is the small size of this radial gasket. The configuration of the radial gasket and the manner in which it is mounted enable the gasket to be disposed such that no additional space is required in order to attach it. The construction thus permits an optimum utilization of the length and the diameter of the filter housing.

Another advantage of the air filter is that the area in which the gasket is mounted is located immediately adjacent the sealing area, and thus, first of all, these two functions are separated, but on the other hand there is no danger that the sealing area might not be sufficiently secured when the insert is installed or removed and might roll or become canted.

According to a further development of the invention it is proposed that the attachment ring extend all the way to the sealing area of the radial gasket. Thus the sealing area is supported when the filter insert is installed, so that axial forces on the gasket can be effectively absorbed. In one advantageous embodiment the attachment ring for the radial gasket can simultaneously be constructed as an end plate. In this manner considerable manufacturing cost can be saved. Furthermore, a ring made in one piece has the advantage that sealing problems can not occur at additional joints.

To increase the elasticity of the radial gasket, the gasket can be further developed such that, by forming the gasket in a special shape, a hollow space will be produced between the gasket and the attachment ring, so that the gasket in the uncompressed state will contact the attachment ring annularly only at its two outer ends or axial edges. In the installed state the pressure created between the nipple and the gasket will urge the gasket into contact with the attachment ring over substantially its entire sealing area.

The invention can be further developed by forming the shape of the radial gasket at the sealing surface facing the nipple conically, i.e. by beveling the edge of the seal, so that the installation of the filter insert in the filter housing is facilitated. Likewise, of course, the nipple can also be constricted or narrowed at its end facing the filter insert. This likewise contributes to easier installation of the filter insert.

In general, the design of the gasket and the manner of its attachment achieve a secure sealing of the clean air side of the air filter, even despite the vibrations which occur in vehicles.

Additional advantageous features are set out in the following description.

BRIEF DESCRIPTION OF THE DRAWINGS

The invention will be explained below in further detail with reference to illustrative preferred embodiments shown in the accompanying drawings in which.

DETAILED DESCRIPTION OF PREFERRED EMBODIMENTS

Figure 1:
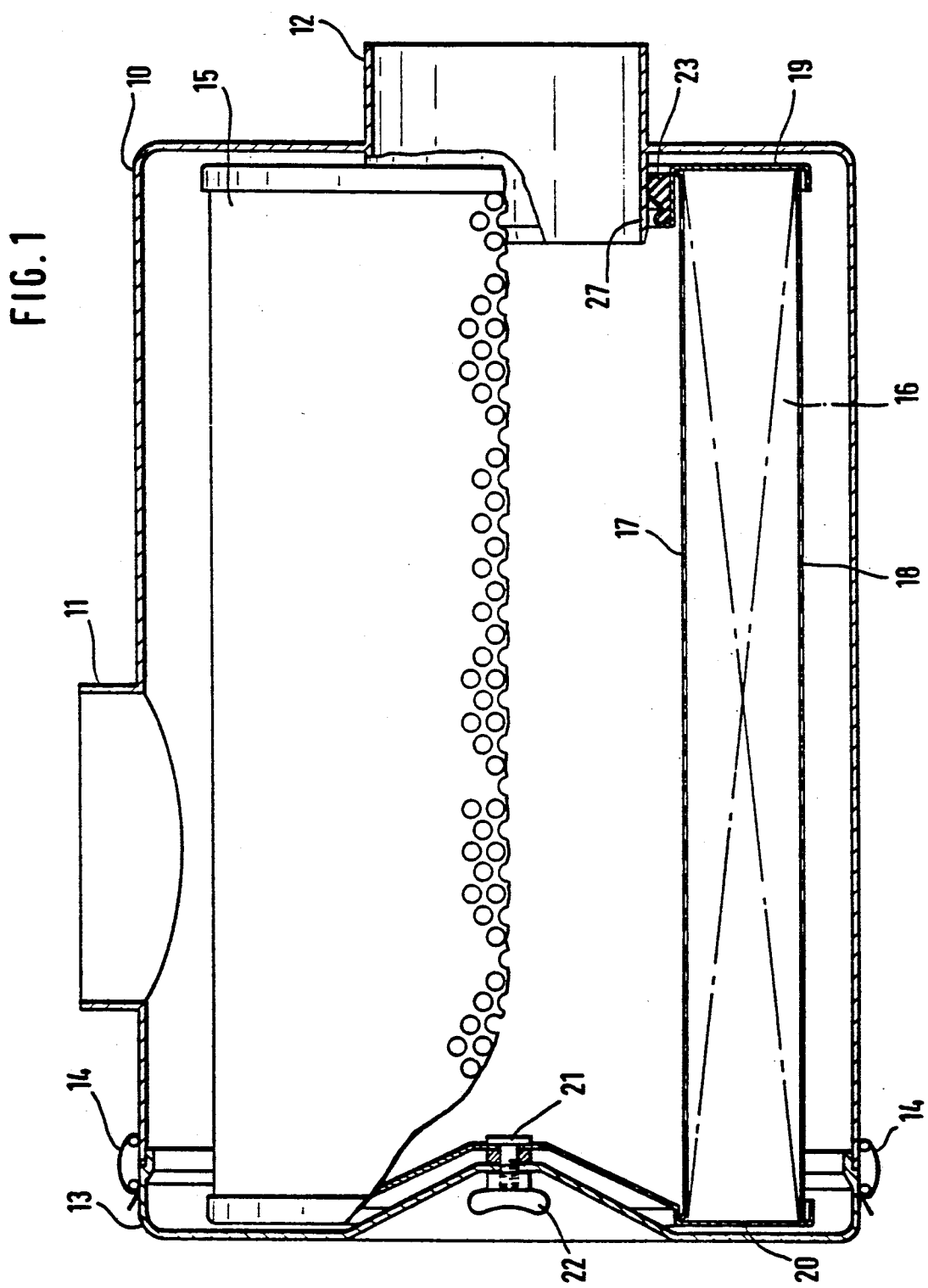
FIG. 1 is a sectional view of an air filter housing.

The air filter shown in FIG. 1 comprises a housing 10 having a raw air inlet 11 and a clean air outlet 12. The housing is closed at its end opposite the clean air outlet by a cover 13. Several clamps 14 distributed around the circumference provide for secure fastening of the cover 13.

The clean air outlet 12 of the housing is a tubular projection or nipple 27 which extends both outwardly and partially inwardly into the housing.

A filter insert 15 consists in a known manner of an accordion-pleated filter paper 16 which is arranged between an inner support sleeve 17 and an outer support sleeve 18. The ends of the filter insert 15 are closed by end plates 19 and 20. End plate 20 is provided in its center with a threaded stud 21. By means of this threaded stud the filter insert 15 is affixed with a wing nut 22 to the housing cover 3.

At the opposite end the insert 17 is provided with an end plate 19 which carries a radial gasket 23. This radial gasket 23 engages the inwardly extending nipple 27 of the clean air outlet 12.

Figure 2:
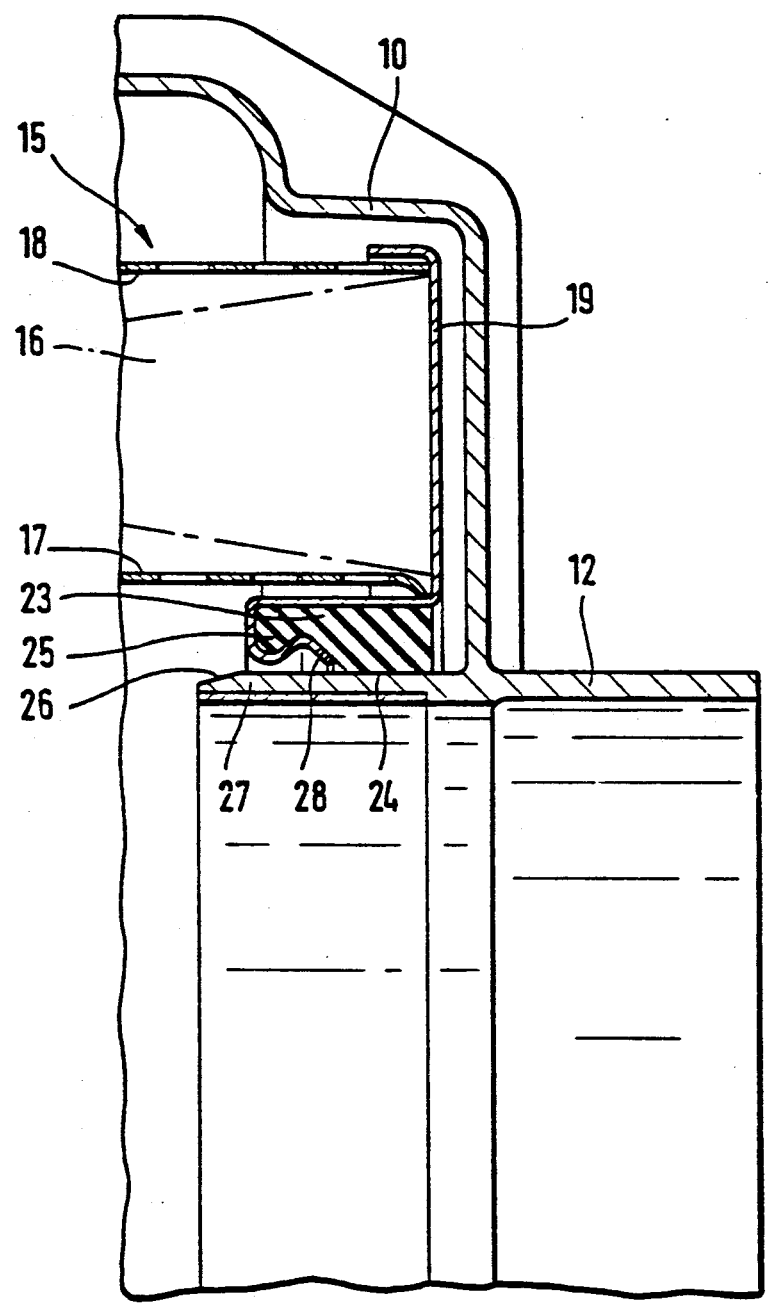
FIG. 2 shows a detail view of the construction and mounting of the radial gasket.

FIG. 2 shows the configuration of the gasket area with the construction of the gasket in further detail. The housing 10 with the clean air outlet 12 is shown here only partially. The portion of the filter insert 15 facing the clean air outlet is visible in the housing.

Figure 3:
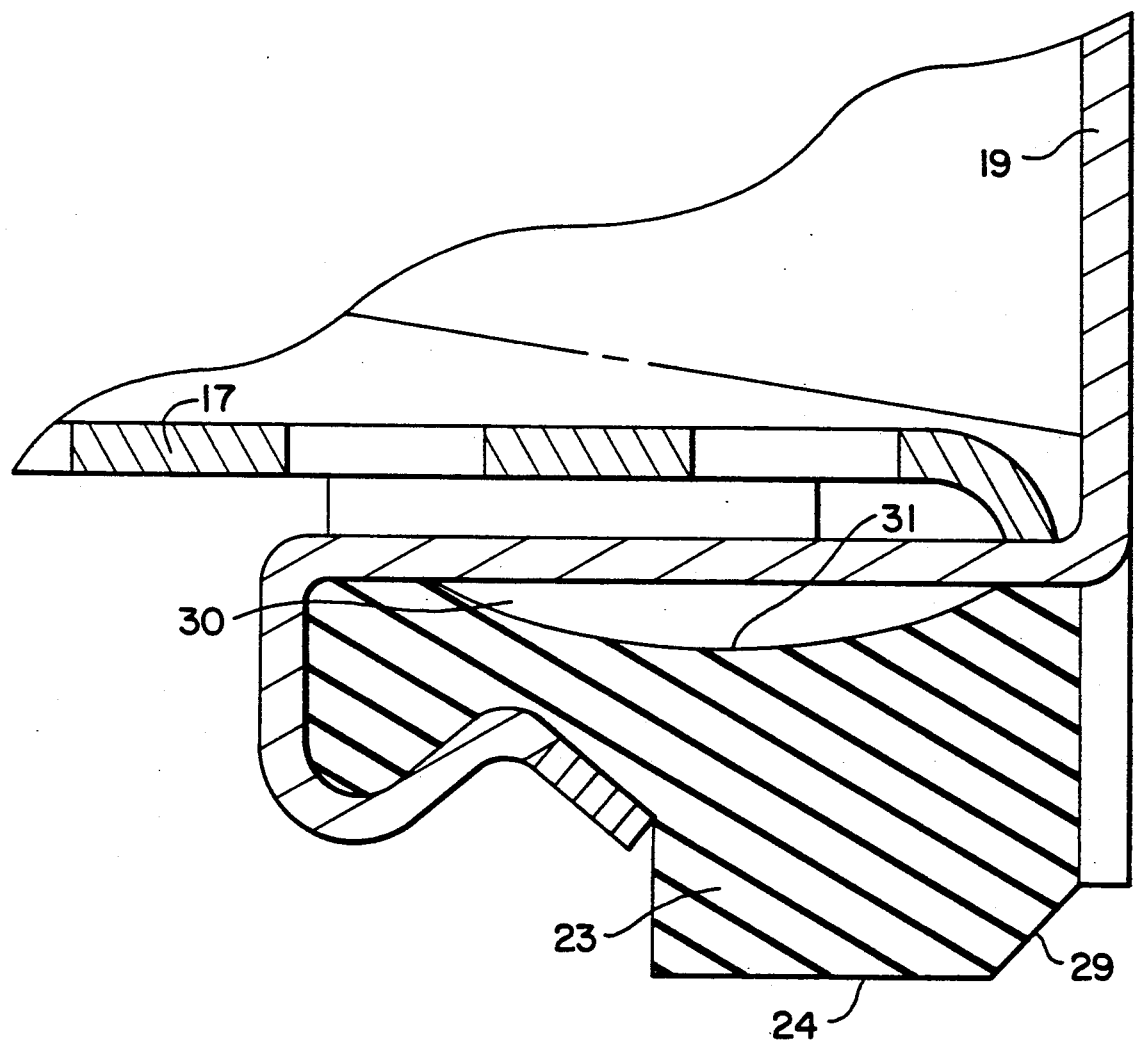
FIG. 3 shows an enlarged detail view of the radial gasket in the uncompressed state.

The end plate 19 of this filter insert extends longitudinally along the sleeve 17 and encloses or is beaded around the radial gasket 23 to a point close to the sealing area 24. The sealing surface 28 of the end plate 19, which extends to a point close to the sealing area 24, has the purpose of supporting the radial gasket when the filter insert 15 is pushed onto the nipple 27. The radial gasket 23 is shaped such that an attachment portion is formed by a bead-like prominence 25 and, after a slight indentation, the area 24 follows which provides the seal between the raw air chamber and the clean air chamber. As shown in FIG. 3, seal portion 24 of gasket 23 has a greater radial height than attachment portion 25.

The radial gasket 23 has a slight conical configuration or bevel 29 visible in FIG. 3 at the edge of the gasket sealing area 24, which flares outwardly to facilitate installation of filter insert 15 by simply pushing the radial gasket 23 onto the nipple 27 of clean air outlet 12. Nipple 27 also has a narrowed or constricted region or beveled edge 26, which facilitates sliding the filter insert onto the clean air outlet.

The effective sealing area of the radial seal against the nipple 27 of the clean air outlet is selected to be sufficiently large to provide good damping action on externally caused vibrations, so that a secure seal will be assured under all operating conditions.

The length of the sealing area 24 is furthermore advantageous in the case of slight differences in the length of the filter insert 15. When the filter insert is replaced, the fact the sealing area is configured in this manner, will prevent such differences in length from causing dirt that has settled on the raw air side of the nipple 27 to then be located on the clean air side due to the slightly greater length of the new filter insert.

To increase the elasticity of radial gasket 23, the gasket may be formed in a special shape shown in FIG. 3. Radial gasket 23 has a sealing surface 31 with a concave curvature facing the filter insert 15 so that in the uncompressed state only the two outer ends or axial edge areas of the gasket 23 contact attachment ring 19. A hollow space 30 thereby is produced between the gasket and the attachment ring 19. When the filter gasket is installed on a nipple 27, the pressure created between the nipple and the gasket urges the sealing surface 31 of the gasket into contact with the attachment ring over substantially its entire area.

The foregoing description and examples have been set forth merely to illustrate the invention and are not intended to be limiting. Since modifications of the described embodiments incorporating the spirit and substance of the invention may occur to persons skilled in the art, the scope of the invention should be construed to include all variations falling within the ambit of the appended claims and equivalents thereof.

What is claimed is:

1. An air filter for an internal combustion engine comprising:

a housing having an air inlet at a raw air side and an air outlet at a clean air side, said air outlet being provided with a tubular projection extending into the interior of said housing, and an annular filter insert releasably fastened in said housing such that air flows radially through said filter insert from the outside in, said filter insert having a radial gasket provided on one end thereof facing said tubular projection, said gasket engaging said tubular projection and sealing a raw air chamber from a clean air chamber in said filter housing, said radial gasket (23) comprising an attachment portion provided with an annular bead (25) and having a height in the sealing direction which is smaller than an intermediate space between said one end of said annular filter and said tubular projection, said radial gasket (23) further comprising a seal portion arranged axially adjacent said attachment portion, said seal portion producing a seal (24) between said tubular projection (27) and said one end of said filter insert (15), and wherein an attachment ring (19) is arranged on said filter insert (15), said attachment ring engaging said radial gasket (23) and extending around said annular bead (25) of said attachment portion to attach said gasket to said filter insert.

2. An air filter according to claim 1, wherein said attachment ring (19) covers a part of said seal portion of said radial gasket (23) such that axial forces acting on said seal portion, which are directed toward said attachment ring, are absorbed by said attachment ring.

3. An air filter according to claim 1, wherein said attachment ring (19) comprises an end plate which extends over the entire end face of said filter insert (15).

4. Air filter according to claim 1, wherein said radial gasket (23) has a sealing surface with a concave curvature facing the filter insert (15) so that in the uncompressed state only axial edge areas of said gasket (23) contact said attachment ring (19).

5. An air filter according to claim 1, wherein said radial gasket (23) has a sealing surface (24) facing said tubular projection (27), said sealing surface having a beveled edge (29) at one end for facilitating pushing said filter insert (15) with said radial gasket onto said tubular projection (27).

6. An air filter according to claim 1, wherein said seal portion has a height in the sealing direction which is greater than the height of said attachment portion in the sealing direction.

* * * * *